Dec. 12, 1967  J. E. GUTRIDGE  3,357,371
CONTAINER WELL CAR
Filed April 12, 1965
3 Sheets-Sheet 3
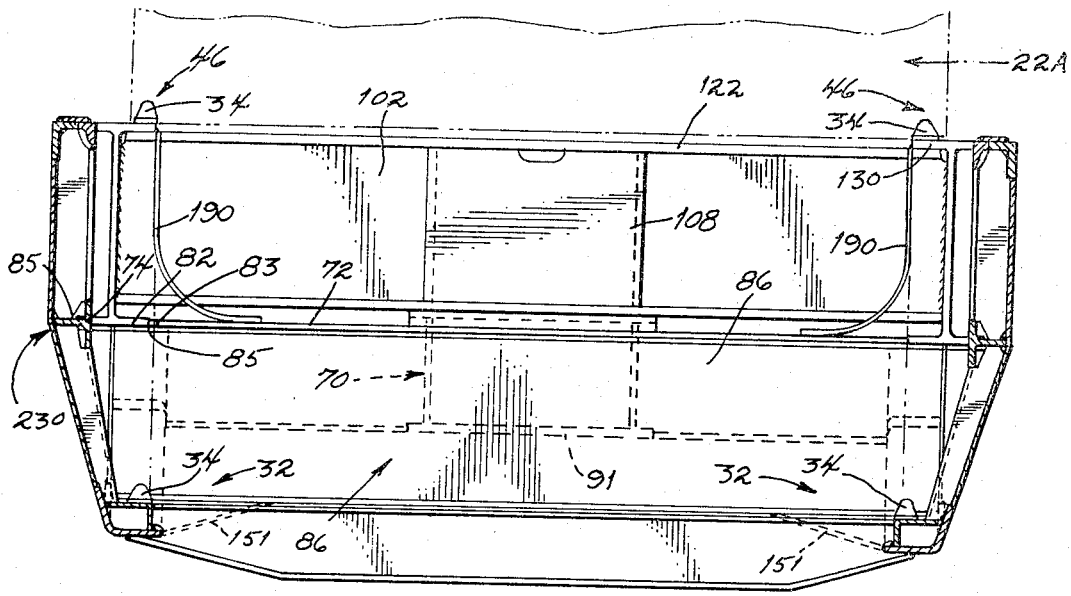
FIG_8_
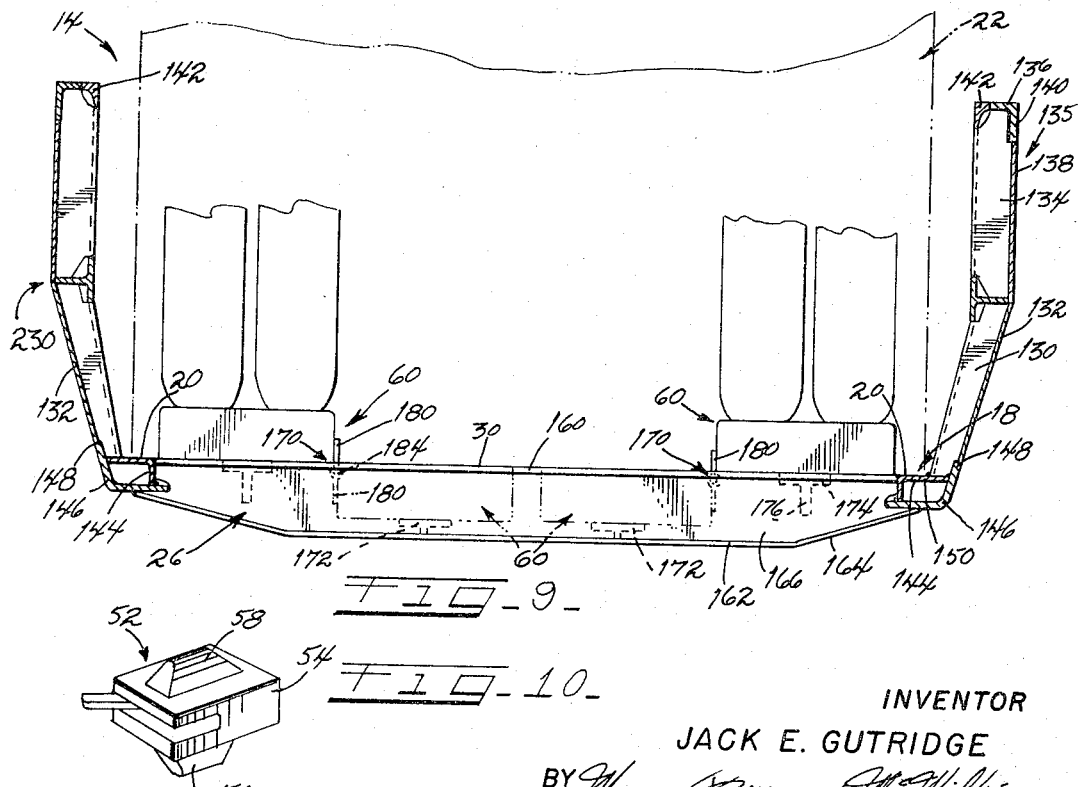
FIG_9_
FIG_10_
INVENTOR
JACK E. GUTRIDGE
BY *Mann, Brown & McWilliams*
ATT'YS.

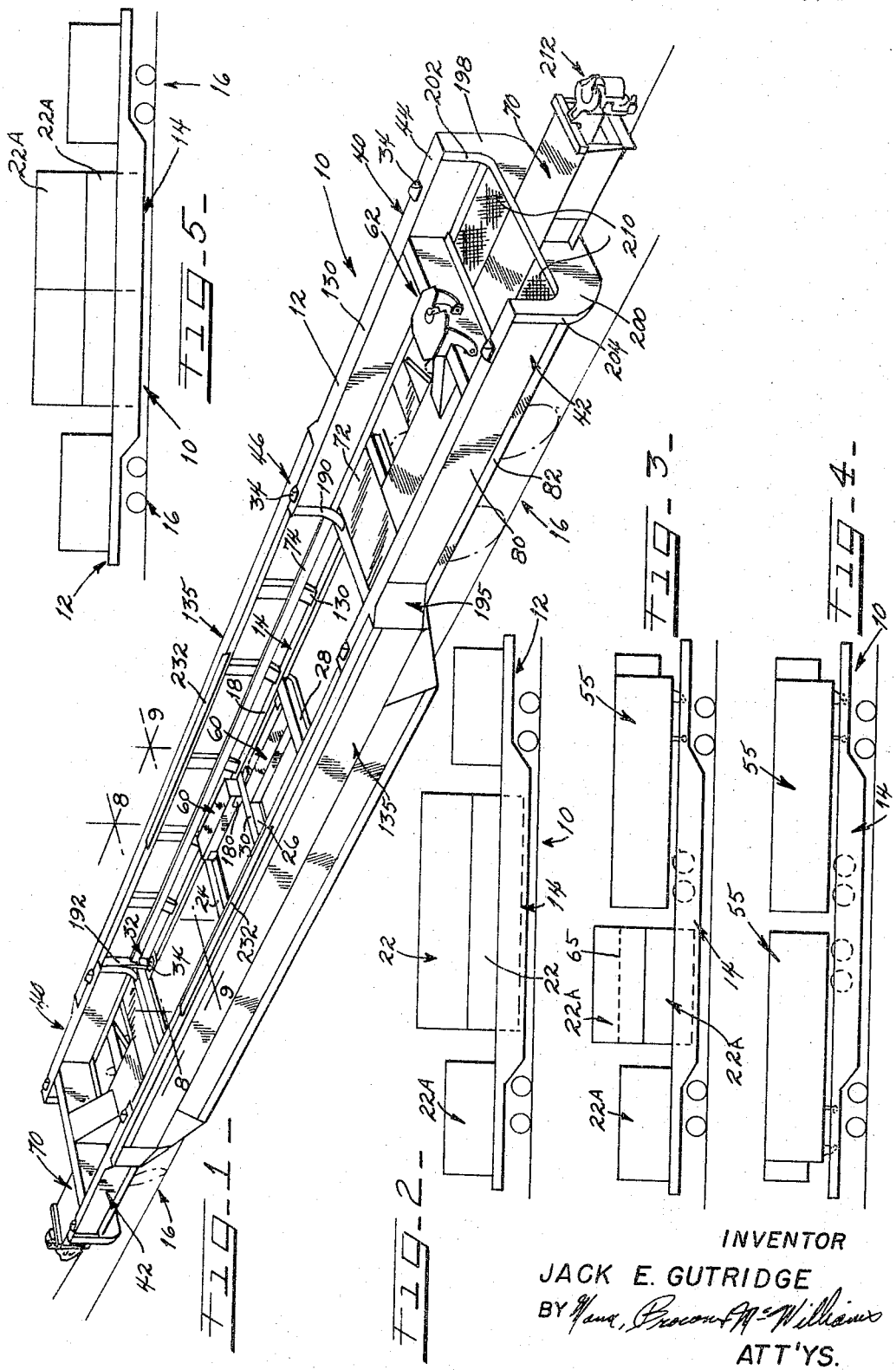

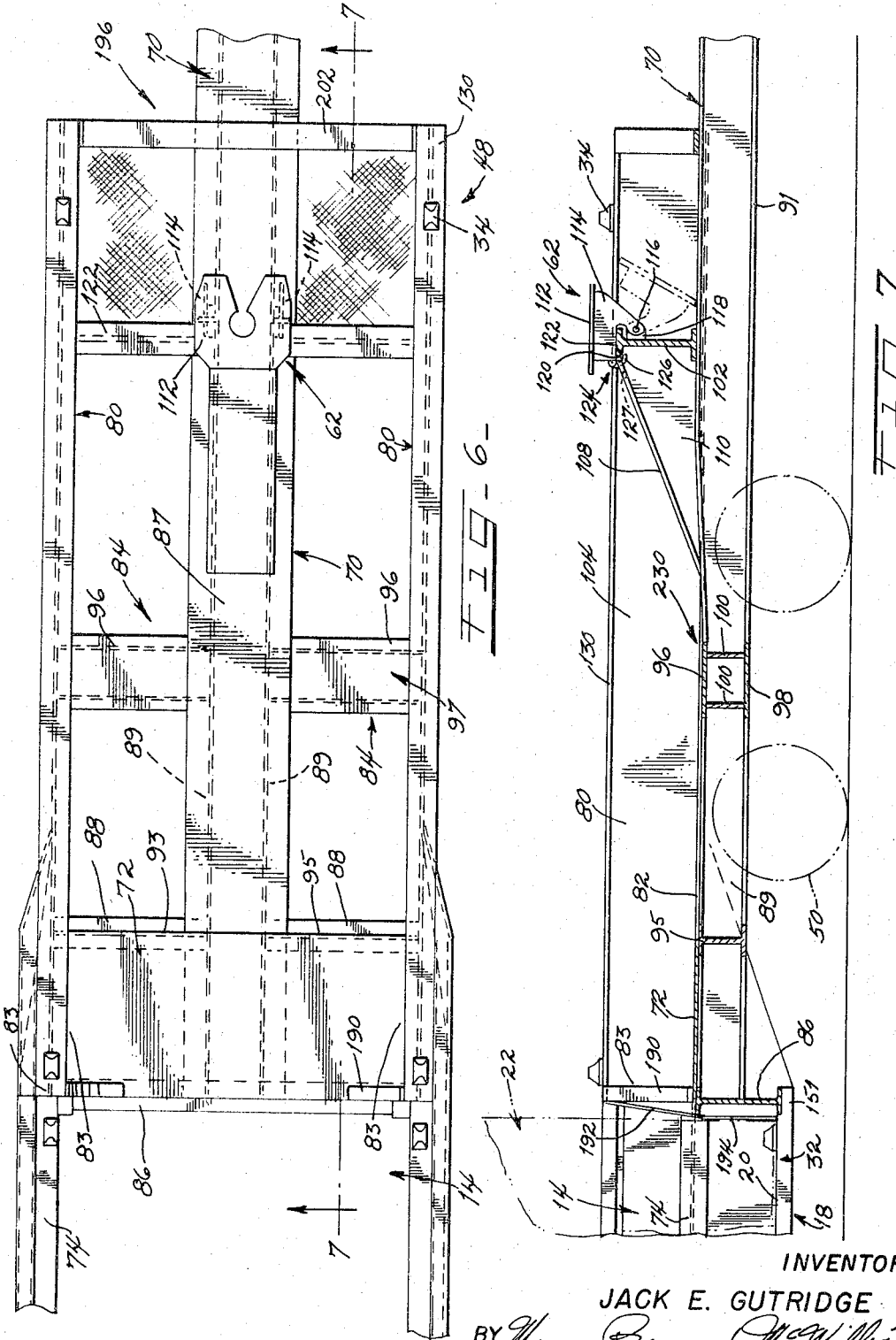

United States Patent Office 3,357,371
Patented Dec. 12, 1967

3,357,371
CONTAINER WELL CAR
Jack E. Gutridge, Dyer, Ind., assignor to Pullman Incorporated, Chicago, Ill., a corporation of Delaware
Filed Apr. 12, 1965, Ser. No. 447,340
13 Claims. (Cl. 105—366)

My invention relates to a container well car, and more particularly, to a novel car arrangement for transporting freight containers that achieves a maximum container carrying capacity within recognized clearance lines and without extending car lengths.

Conventional cars for carrying trailers and/or freight containers are arranged to carry either two 40 foot length containers or trailers, or four 20 foot containers, all arranged end to end and extending longitudinally of the car.

Because of the width and height restrictions imposed by A.A.R. clearance lines, and the practical difficulties in handling cars much in excess of 85 feet in length, the industry has in general assumed that maximum practical load carrying capacity of freight containers and trailers was achieved using the standard car lengths and loading arrangements indicated.

A principal object of my invention is to increase the load carrying capacity or cube capacity of cars of this type when used for containers as much as fifty percent without increasing the length of the car or exceeding recognized auto rack clearance lines.

Another object of this invention is to provide a railroad car that is specifically arranged to give a substantially increased load carrying capacity when using solely freight containers over all-trailer or mixed trailer and container loads.

Other important objects of the invention are to provide a crane loaded railroad car arrangement that will alternately and selectively carry either all freight containers or all trailer loads, or loads consisting of both trailers and containers, to provide a unique and simplified framework arrangement for freight cars, and to provide a railroad car arrangement that is economical of manufacture, convenient in use, and adapted to carry trailers and freigh containers of standard design.

Other objects, uses, and advantages will be obvious or become apparent from a consideration of the following detailed description and the drawings.

In the drawings:

FIGURE 1 is a diagrammatic perspective view illustrating one embodiment of my invention as arranged to carry both freight containers and trailers;

FIGURES 2, 3, 4, and 5 illustrate a number of alternate ways in which the car of FIGURE 1 can be loaded, with FIGURES 2 and 5 showing how maximum cube carrying capacity of the car is achieved using freight containers;

FIGURE 6 is a plan view of the right hand end of the car shown in FIGURE 1;

FIGURE 7 is a vertical sectional view taken substantially along line 7—7 of FIGURE 6;

FIGURE 8 is a transverse cross-sectional view of the car taken substantially along line 8—8 of FIGURE 1;

FIGURE 9 is a transverse cross-sectional view of the car taken substantially along line 9—9 of FIGURE 1; and FIGURE 10 is a perspective view of a container cone type indexing and support device that may be used in the vertical stacking of containers as shown in FIGURES 2, 3 and 5.

However, it should be understood that the specific drawing illustrations provided are supplied primarily to comply with the requirements of 35 U.S.C. 112, and that the invention may have other specific embodiments coming within the scope of the appended claims.

*General description*

Reference numeral 10 of FIGURES 1–5 generally indicates a specific embodiment of my invention in which the car 10 comprises a wheeled framework 12 formed to define a depressed freight container support well 14 intermediate the car trucks 16 (the trucks being only diagrammatically illustrated).

The well 14 is proportioned lengthwise of the car to receive a single standard 40 foot length container (see FIGURE 2), or to receive two standard 20 foot length containers positioned in end to end relation (see FIGURE 5).

The car frame portion that defines well 14 includes freight container support chords or ledges 18 on either side of the well which define upwardly facing planar load support surfaces 20. The chords 18 are spaced apart transversely of the car to permit the side edges of standard 40 or 20 foot length containers to rest on the surfaces 20, as indicated in dashed lines in FIGURE 9 wherein the container is indicated by reference numeral 22. Adjacent the mid portion of the car the chords or ledges 18 are secured in spaced apart relation by spaced tie beams 24, 26 and 28, with the tie beam 26 being positioned at the longitudinal center of the car and having its upwardly facing surface 30 level with the chord surfaces 20 and proportioned to support the adjacent ends of 20 foot container lengths when they are disposed in end to end relation in the manner suggested by FIGURE 5.

At each end of the well 14, a pair of freight container indexing bracket structures 32 are provided that include upwardly directed locating cones 34 of a conventional type that are proportioned and spaced to mate with correspondingly located and complementarily shaped recesses formed in conventional freight containers at their corners. A freight container indexing device 32 is located at each end corner of the well 14 to provide appropriate locating action on the respective containers, and this locating action should be such that the containers are positioned transversely of the car approximately as shown in FIGURE 9 and longitudinally of the car approximately as shown in FIGURE 7.

The car frame further comprises a pair of wall structures 40 and 42 at each end of the car positioned over the car trucks which carry on their upper load bearing surfaces 44 a set of spaced container indexing bracket devices 46 comprising the aforedescribed cone members 34, which are spaced apart longitudinally and transversely of the car to be received in similarly located and complementarily shaped pockets of standard 20 foot length freight containers.

The car 10 is described to this point as arranged to carry in well 14 either standard 40 foot containers arranged as shown in FIGURE 2 or 20 foot length standard freight containers in the end to end relation shown in FIGURE 5. However, an important aspect of this invention is that the surfaces 20 of chords or ledges 18 in well 14 are positioned substantially at the axle level of the railway car truck wheels 50 (see FIGURE 7), and with this arrangement, as indicated in FIGURE 2, a first standard 40 foot container 22 (which measures a nominal 8 by 8 by 40 feet in width, height and length dimensions) may be applied directly to the bottom of well 14 on chords or ledges 18, and a second standard 40 foot container 22 may be stacked directly on top of the first container 22 without raising the elevation of the load carried by the car 10 outside of the established clearance line for auto rack cars.

Furthermore, half length load or 20 foot containers 22A may be applied to either end of the car astride the car trucks in operative relation with the container indexing devices 34.

It may be added that when the containers 22 are stacked as shown in FIGURE 2 in the well of the car, a suitable arrangement should be used to make the upper container 22 fast with the lower container 22. Since containers of this type conventionally employ cone receiving recesses in both their upper and lower corners, double ended container indexing and securing devices, such as the device shown at 52 in FIGURE 10 may be employed between the upper and lower containers. The device 52 comprises a body 54 provided with oppositely directed cone portions 56 and 58, and in making the stacking arrangement of FIGURE 2, four of the devices 52 would be employed in which the cone members 56 would be located in the upwardly directed corner recesses of the lower container 22, and then the upper container 22 would be lowered down onto the lower container 22 with the cone members 58 seating in the lower pockets of the upper container 22.

It is also pointed out that containers 22 and 22A use to be applied to car 10 by means of an appropriate crane loading operation. Conventional containers 22 conventionally have operably secured to their upper surfaces suitable eyes (not shown) adjacent their corners for engagement with conventional crane lifting equipment for shifting to and from the railroad car.

As indicated in FIGURE 5, the containers in the well 14 may comprise adjacent stacks of 20 foot containers 22A, and this would provide a load carrying capacity closely approaching that of FIGURE 2.

Further in accordance with this invention, car 10 is also arranged to carry highway trailer bodies, such as the bodies 55 of FIGURES 3 and 4.

To this end, highway chassis railway supporting planks or beams 60 are retractably mounted at the mid portion of the car in the bottom of well 14, and a retractable fifth wheel stand 62 is operably mounted adjacent each end of the car.

If it is desired to support a trailer body 55 in the manner suggested in FIGURE 3 on car 10, the pair of planks 60 at that end of the car are moved from the broken line inoperative position of FIGURE 9 to the full line operative position of that figure wherein they are positioned to receive the rear wheels of trailer body when the trailer body is crane lifted onto the car. The stand 62 is positioned as indicated in FIGURES 1 and 7 to receive the trailer fifth wheel kingpin, and the fifth wheel stand arrangement 62 includes a suitable latching arrangement for locking the fifth wheel kingpin to the car.

Thus, when the car 10 is loaded as indicated in FIGURE 3, one half of the car carries half length freight containers 22A while the other end of the car carries the trailer body 55.

If so desired, a second trailer body 55 may be applied to the car in place of the freight containers shown in FIGURE 3, in which case the fifth wheel stand and rear wheel supporting planks at that end of the car are placed in their operative relations as described immediately above to receive the crane lifted trailer.

Furthermore, half load containers in the form of half height containers, as distinguished from half length containers 22A, may be stacked on car 10. The dashed line 65 of FIGURE 3 suggests the use of two of such containers in stacked relation instead of a container 22A, and when a single half height container is so employed on top of a container 22A, the top thereof will give a clearance similar to that of a trailer. Such half height containers may be used in either nominal 20 or 40 foot lengths, and thus may be interchanged and stacked following any of the arrangements shown in FIGURES 2, 3 and 5 with results of the type indicated.

Consequently, it will be seen that the arrangement of car 10 permits a substantial increase in the load carrying capacity of the car, and when the car carries an all container load of one of the arrangements shown in FIGURES 2 and 5, a load carrying capacity will be increased fifty percent over the standard railroad car arrangement permitting carrying of two 40 foot length containers or trailers. The principal reason for this is that my design permits containers to be vertically stacked in the well of the car by supporting the lowermost container at the railroad car truck axle level.

*Specific description*

The car frame 12 generally comprises a pair of longitudinally spaced longitudinally extending center sill structures 70 disposed at each end of the car that have the generally rectilinear transverse cross-sectional configuration indicated in FIGURE 8. At the inner end of each center sill structure 70 the center sill has fixed thereto across the top thereof as by welding a stress plate 72 which extends and is fixed between the wall structures 40 and 42.

The walls 40 and 42 each comprise I-beams 80 having lower flanges 82 to which the ends 83 of the stress plate 72 are welded, as at 85 (see FIGURE 8). The I-beam lower flange at the ends 81 of beams 80 are fixed as by welding to longitudinally extending angle beams 74 that are positioned on either side of and extend the length of well 14.

It will also be noted that the stress plate 72 is in horizontal alignment with the beam flange 82 and also with the horizontal flange portion 85 of the respective beams 74 (see FIGURE 8).

The center sill structure 70 is a built up weldment comprising a top plate 87, spaced side plates 89, and a bottom plate 91 (see FIGURE 8). In the area of stress plate 72 the top plate 87 ends at cross tie beams 88 as at 95 and abuts with and is affixed to (as by welding) the edge 93 of the stress plate. The plates 89 and 91 of the center sill structure are joined with the tie beam 86 as indicated in FIGURE 7.

The tie beams 88 comprise I-beam members extending under and welded to flanges 82 of wall beams 80; beams 88 extend to and are welded to center sill plates 87, 89, 91 as well as stress plate 72 where these elements engage each other.

The bolster structurer 97 is of box configuration, as indicated in FIGURE 7, and comprises bolster members made up of upper plates 96 and bottom plates 98 joined together by spaced vertical webs 100. Each bolster member 84 extends under and is fixed to the flanges 82 of wall beams 80; the respective members are appropriately welded to the center sill plates 87, 89 and 91 with plates 96 and 98 being in horizontal alignment with center sill plates 87 and 91, respectively. Between the bolster members 84 and interiorly of the center sill structure 70 is the usual arrangement (not shown) for coupling railroad car truck to the bolster structure, which arrangement may be of any conventional type.

The fifth wheel stand 62 is mounted on an I-beam 102 which is fixed as by welding between the top of the center sill structure 70 and the webs 104 of the respective wall beams 80 (see FIGURE 8). The cross beam 102 is suitably braced by a diagonal strengthening structure comprising an upwardly inclined top plate 108 and spaced side plates 110 welded between the top plate 108, the plate 87 of the center sill structure, and the beam 102 in any suitable manner.

The fifth wheel stand 62 itself comprises a fifth wheel plate member 112 affixed to a pair of spaced flange members 114 that are pinned as at 116 to spaced lugs 118 that are in turn affixed to the beam 102 substantially in the manner indicated in FIGURE 7. The stand flange members 114 are each shaped to define a flat seat position 120 which rests on the upper surface 122 of the I-beam 102 in the elevated operative position of the stand, in which position the stand is held in place by a suitable latch device generally indicated at 124. In the retracted position of the stand, the stand takes the position shown in broken lines in FIGURE 7.

The latch device 124 may be of any conventional type but it is illustrated as having a latch arm 126 adapted to be received under the top of I-beam 102 (through a suitable opening 127 in plate 108) and suitable spring means may be employed to bias the latch arm into its illustrated operative position; also, a suitable handle arrangement may be employed to move the latch arm between its latching position and its unlatching position as desired.

As indicated in FIGURES 1 and 8, the cone members 34 of container indexing devices 48 are applied directly to the top flanges 130 of the beams 80 of wall structures 40 and 42. Wall structures 40 and 42 are spaced apart laterally of the car a distance corresponding to the spacing between standard container indexing cone receiving pockets.

At the well 14, the longitudinally extending beams 74 are affixed to the container supporting chords 18 by spaced rib structures 130, which comprise channel members having their ends welded between the respective beams 74 and chords 18 as well as lower well cover plates 132. Similar channel shaped rib forming members 134 are welded between the upper sides of the beams 74 and angle members 136 at the top of the well wall structure 135. Top cover plates 138 of the well are affixed between the lower flanges 140 of the angle members 136, and angle members 142 are affixed along the inner edges of wall structures 135 to close off the upper ends of ribs 134.

The chord 18 on each side of the well is in the form of an angle shaped member 144 welded between a longitudinally extending angled plate 146 that has its top edge 148 affixed to the lower cover plate 132. The ridge forming channel members 130 at their lower ends are fixed to both the plate 144 and the plate 146 by welding.

The plate 144 thus defines a horizontally disposed portion 150 which forms horizontally disposed load receiving surfaces 20 on which the container bottoms rest. At the ends of well 14, the chord 18 is joined to beams 86 by welding approprate tie plates 151 between them (see FIGURES 7 and 8).

The tie beams 24, 26 and 28 each comprise upper plates 160 and lower plates 162 and 164 welded to the upper and lower edges respectively of vertically disposed web 166 (see FIGURE 9). The webs 166 of each tie beam extend between and are welded to the plates 144 and 146 as indicated in FIGURES 8 and 9.

The beams or planks 60 are hniged between adjacent tie beams 24 and 26, and 26 and 28 by appropriate hinges 170, and support plates 172 are provided affixed to the respective webs 166 for supporting the beams or planks in their retracted inoperative positions.

Support plates 174 affixed to the respective tie beams 24, 26 and 28 and braced by webs 176 are provided to support the planks 60 in their elevated operative positions of FIGURE 9.

The hinge structure 170 may be of any appropriate and conventional type, but in the form shown comprises a hinge leaf 180 affixed in any suitable manner to the respective beams 60, with the respective leaves each having fixed thereto as by welding a pin 184 that is swingably lodged in a pivot sleeve 185 affixed to the respective beams 24, 26 and 28.

As indicated in FIGURES 1 and 8, curved guide plates 190 are affixed between the top flanges 130 of wall structures 40 and 42 and the upper surface of the tie beam 86 for the purpose of aiding in guiding into place the trailer bodies when they are being lowered into resting engagement with the car.

Also, inclined guide plates 192 merging into vertical guide plates 194 are applied at each end of the well 14 adjacent the respective container locating the devices 32 (see FIGURE 7) for the purpose of aiding in lowering the containers into their correct positions within the car well 14.

It will thus be seen that the wall structure 135 of the well 14 are spaced apart sufficiently to receive and lower the standard size containers onto the support surfaces 20 of chords or ledges 18, while the wall structures 40 and 42 are spaced apart to receive containers of standard widths on top of them and in operative engagement with the indexing devices 46. These two wall structures are appropriately joined together by connecting cover plates as at 195.

At each end of the car, an end sill structure 196 is provided comprising end plates 198 and 200 fixed between the center sill structure and wall structures 40 and 42, respectively. A U-shaped flange member 202 is applied along the upper edges of the plates 198 and 200 and extends between these two plates and the wall structures 40 and 42, and on the outside of the car, a band member 204 is affixed along the outwardly extending edges of the respective plates 198 and 200 and between the top flanges 130 of the I-beams 80 and the center sill structure 70. Between the end sill structure 196 and the fifth wheel stand support beam 102 are applied a pair of gratings 210 on either side of the center sill for personnel to stand on when operating the fifth wheel stand 62. The positioning of the fifth wheel stand support beam 102 above the center sill serves as a barricade to warn personnel from stepping further into the car and thus through the open spaces between the fifth wheel stand support beam and the bolster members 84.

The ends of the center sill structures 70 are provided with the usual couplers 212 which are preferably operably associated with a suitable form of end of car cushioning arrangement.

An important feature of the arrangement of car frame 12 is that the center sill upper plates 87, the stress plates 72, the lower flanges 82 of wall beams 80, and the main beams 74 of the pocket are all in substantial horizontal alignment. Thus draft and buff forces transmitted to the beams 74 are transmitted along a substantially horizontal plane from the center sill structures through the shear connections at the stress plate 72 and the flanges 82 of wall beams 80 thence to beams 74 through the end to end engagement therewith of the flanges 82. The beams 80 at their flanges 82, as already indicated, are rigidly connected to the ends of elongate beams 74, and thus beams 74 comprise tension and compression members that extend longitudinally of the car body and comprise the main members for transmitting longitudinal forces longitudinally of the car.

It will be noted from an inspection of FIGURES 8 and 9 that the elongate beams 74 are disposed at approximately the mid section or median point of the wall structure 135 so that the longitudinal forces transmitted along them are spread out evenly above and below these members 74.

It will therefore be seen that the center sill structure 70, the shear plate 172, the lower flange 82 of wall beams 80, and the well beams 74 comprise a planar force transmitting framework that extends the length of the car; at the ends of the car, this structure, which has been designated reference numeral 230 in FIGURES 7–9, transmits longitudinal forces along the center line of the car up to the stress plates 72 whereupon the stresses are transmitted through shear connections to the beams 80 and thence to beams 74 that extend longitudinally of the car along the car well side walls. As is clearly evidenced from the drawings, there is no center still structure running through the well 14 of car 10, and as a matter of fact, the well is open inwardly of the chords 20 except for the cross tie beams 24, 26 and 28, and planks 60.

Adjacent the mid portion of the car along the tops of the side walls 135 upwardly extending flanges 232 may be provided for purposes of tieing down trailers in any conventional manner. Thus, appropriate holes may be formed in the flanges 232 for receiving hooks of tie down ropes or chains or the like.

It will therefore be seen that I have provided, using a car that may be on the order of only 85 feet in length, keeping within recognized auto rack clearance lines, the container transporting arrangement that will increase by fifty percent the container carrying capacity of the car. Furthermore, if containers having half the height of normal 8 by 8 by 20 or 40 foot containers are employed, and in the stacked relation of say FIGURES 2 and 5, the car will be within standard A.A.R. clearance lines, although using half height containers in the container well, the increased capacity of the car will only be on the order of 25 percent.

An important aspect of this car is that using the standard 8 by 8 by 20 or 40 foot containers above referred to, the center of gravity will be only 75 inches above the top of rail. In most container car arrangements an 85 inch center of gravity location is common, while in piggyback cars the center of gravity in the area of 90 inch will be occasioned. The center of gravity referred to is for the fully loaded car including the trucks. In the illustrated arrangement, chords 20 and beams 24, 26 and 28 as well as container indexing devices 32 are positioned to dispose the bottom of containers resting in well 14 at an elevation approximating 18 inches above the top of rails, which means that containers stacked as shown in FIGURES 1, 3 and 5 would have an elevation on the order of seventeen and one-half feet above the top of rail.

The indexing devices 32 and 46 may be arranged to provide a hold down locking action in the manner suggested by my Patent 3,163,129, granted Dec. 29, 1964.

The wall structures 40, 42 and 135 should be proportioned in height to provide a spacing in the range of 8 to 12 inches between the tops of these structures and the undersides of trailer bodies 55 when the latter are mounted on car 10 to permit trailer body lifting crane arms to be received under bodies 55.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. A railroad car for handling freight containers comprising:

a car frame riding on spaced railroad car trucks, said frame being formed to define a depressed freight container support well intermediate said trucks, said well having an open top and an unobstructed container receiving space between the trucks, said space being proportioned the width of the car to support one or more containers lying in end to end relation in said well at a level disposing the bottom portion of the container adjacent the axle level of said trucks, said frame over each truck including container load support means for supporting an end located container thereon astride the respective trucks and above the well, a pair of continuous structural support members positioned on either side of said well and extending longitudinally of the car, said structural support members forming part of said frame, coupler force transmitting means for making like ends of said structural support members fast to each other and for transmitting forces acting longitudinally of the car to said structural support members, whereby said structural support members serve as columns acting in tension and compression to transmit said forces longitudinally of the car on either side of said well, said coupler force transmitting means including a pair of longitudinally spaced end located stub center sill structures above the well bottom, each center sill structure being on each respective end of the well and extending over a respective car truck, said structural support members having their upper surfaces at a level below the upper portion of the container and above the lower portion of the container when stored in the well to enable removal of the container by lifting the container by crane means or the like, and the said structural support members of the frame defining wall structures extending substantially the entire length of the car, support means in the well extending between the wall members, said wall structures being spaced apart from one another at greater distances in the area of the well than in the area of the trucks allowing containers of the same width to be disposed between the wall structures on said support means in the area of the well or atop the wall structures in the area of the trucks.

2. The invention according to claim 1 and said wall structures comprising a pair of continuous beam members positioned on either side of said well and extending longitudinally of the car, said beam members at their respectively outwardly extending ends being fixed to the respective stub center sill structures adjacent each in substantial coplanar relation.

3. The invention according to claim 1 and said wall structure defining said upper surface and said surface being surmounted by said container load support means including container indexing means.

4. The invention according to claim 1 and said frame at the ends of said well including container load support and indexing means adjacent the level of the axle of the trucks and said frame adjacent the mid portion of said well including container load support means adjacent said level and made fast to said beam members.

5. The invention according to claim 1 and retractable trailer chassis support means positioned adjacent the mid portion of said well and adjacent said axle level, and retractable fifth wheel stand means mounted on at least one of said sill structures in general vertical alignment with the sill structures, whereby the car may selectively alternately carry highway vehicle chassis in place of containers at a selected load carrying position.

6. The invention according to claim 5 and said wall structures flanking a respective center sill structure, and said trailer chassis fifth wheel stand means supportable above at least one of said center sill structures between one of said pair of wall structures and having a trailer support surface extending above and between said one pair of wall structures with said one pair of wall structures being proportioned in height to leave a trailer removal spacing between the tops of said one pair and the trailer chassis when the latter is carried by the car.

7. The invention according to claim 1 and said wall structures each comprising a continuous beam member positioned on a respective side of said well and extending longitudinally of the car, each beam member comprising two vertically spaced chords.

8. The invention according to claim 1 and said car well being provided with a substantially open bottom construction.

9. The invention according to claim 7 and each beam member having a longitudinally extending force transmitting chord element generally on the neutral axis between the two chords, and a transverse shear plate means for each sill structure and connecting with the inner end portion of a respective sill structure and the chord element and lying generally in the plane of the neutral axis for transmission of forces between the sill structures.

10. The invention according to claim 1 and each center sill structure having a transverse shear plate and each wall structure being provided with a longitudinally extending structural support element lying generally in the plane of the center sill structure and connecting with each shear plate, said shear plates and said support elements being in said common plane and said common plane being above the bottom of the well for transmission of the coupler force in said plane from one sill structure to the other, and means for transmitting said forces acting longitudinally of the car.

11. A railroad car for handling freight containers comprising:
a car frame riding on spaced railroad car trucks,
said frame being formed to define a depressed freight container support well intermediate said trucks,
said well having an open top and an unobstructed container receiving space between the trucks, said space being proportioned the width of the car to support one or more containers lying in end to end relation in said well at a level disposing the bottom portion of the container adjacent the axle level of said trucks,
said frame over each truck including container load support means for supporting an end located container thereon astride the respective trucks and above the well,
a pair of continuous structural support members positioned on either side of said well and extending longitudinally of the car,
said structural support members forming part of said frame,
coupler force transmitting means for making like ends of said structural support members fast to each other and for transmitting forces acting longitudinally of the car to said structural support members,
whereby said structural support members serve as columns acting in tension and compression to transmit said forces longitudinally of the car on either side of said well,
said coupler force transmitting means including a pair of longitudinally spaced end located stub center sill structures above the well bottom, each center sill structure being on each respective end of the well and extending over a respective car truck,
said structural support members having their upper surfaces at a level below the upper portion of the container and above the lower portion of the container when stored in the well to enable removal of the container by lifting the container by crane means or the like,
and retractable trailer chassis support means positioned adjacent the mid portion of said well and adjacent said axle level,
and retractable fifth wheel stand means mounted on at least one of said sill structures in general vertical alignment with the sill structures,
whereby the car may selectively alternately carry highway vehicle chassis in place of containers at a selected load carrying position,
and said support means on either side of said well each including a pair of wall structures flanking a respective center sill structure,
and said trailer chassis fifth wheel stand means supportable above at least one of said center sill structures between one of said pair of wall structures and having a trailer support surface extending above and between said one pair of wall structures with said one pair of wall structures being proportioned in height to leave a trailer removal spacing between the tops of said one pair and the trailer chassis when the latter is carried by the car,
and said trailer chassis support means comprising a pair of platform means extending longitudinally of the car and spaced apart laterally of the car,
said platform means being mounted for movement between an operative position in which they are disposed to receive and support the rear wheels of highway vehicle chassis and an inoperative retracted position.

12. A railroad car for handling freight containers comprising:
a car frame riding on spaced railroad car trucks,
said frame being formed to define a depressed freight container support well intermediate said trucks,
said well being proportioned the width of the car to support one or more containers lying in end to end relation in said well at a level disposing the bottom portions of the containers adjacent the axle level of said trucks,
said frame over each truck including means for supporting a freight container thereon astride the respective trucks,
said frame comprising:
a pair of continuous beam members positioned on either of said well and extending longitudinally of the car,
a pair of center sill structures positioned at either end of said well and extending longitudinally of the car,
said beam members at their respective ends being fixed to the respective center sill structures adjacent each in substantial coplanar relation,
said beam members at their respective outwardly extending ends having a car coupler secured thereto for coupling said car to adjacent cars,
said center sill structures each having fixed thereto a bolster structure including means for securing the respective bolster structures to the respective trucks,
said center sill structures terminating inwardly of the car at said well,
said frame on either side of said center sill structures including a wall structure surmounted by container load support means including container indexing means disposed on approximately either side of the respective bolster structures longitudinally of the car,
said wall structures and said container load support means comprising said means for supporting freight containers astride the respective trucks,
said frame in the area of said well being of open frame work construction,
said frame at the ends of said well including container load support and indexing means adjacent said level.
said frame adjacent the mid portion of said well including container load support means adjacent said level and made fast to said beam members,
retractable trailer chassis supports positioned adjacent the mid portion of said well and adjacent said level,
and retractable fifth wheel stand means mounted on each of said sill structures in general vertical alignment with the respective bolster structures,
whereby the car may selectively alternately carry highway vehicle chassis in place of containers at selected load carrying positions,
said trailer chassis supports comprise pairs of plank members extending longitudinally of the car and spaced apart laterally of the car,
said plank members being mounted for movement between an operative position in which they are disposed to receive and support the rear wheels of highway vehicle chassis and an inoperative retracted position.

13. The invention according to claim 1, and said wall structures having a longitudinally extending force transmitting chord element generally on the neutral axis, and a transverse shear plate means for each sill structure and connecting with the inner end portion of a respective sill structure and the chord element and lying generally in the plane of the neutral axis for transmission of forces between the sill structures.

References Cited

UNITED STATES PATENTS

| | | | |
|---|---|---|---|
| 1,699,649 | 1/1929 | Willoughby | 105—360 |
| 1,872,272 | 8/1932 | Furrer | 105—360 |
| 2,180,530 | 11/1939 | Kassler et al. | 105—253 |
| 2,305,444 | 12/1942 | Pond | 105—368 |
| 2,837,037 | 6/1958 | Holmberg | 105—368 |
| 2,883,945 | 4/1959 | Walker | 105—368 |
| 2,901,986 | 9/1959 | Furrer | 105—368 |
| 3,070,041 | 12/1962 | Gutridge | 105—368 |
| 3,138,118 | 6/1964 | Dean | 105—392.5 |
| 3,180,284 | 4/1965 | Austgen et al. | 105—366 |
| 3,240,168 | 3/1966 | Charles et al. | 105—406 |
| 3,242,879 | 3/1966 | Bronlund | 105—367 |
| 3,253,556 | 4/1966 | Glaser et al. | 105—406 |

ARTHUR L. LA POINT, *Primary Examiner.*

DRAYTON E. HOFFMAN, *Examiner.*